United States Patent [19]
Kaul et al.

[11] Patent Number: 5,571,899
[45] Date of Patent: Nov. 5, 1996

[54] SALTS OF METAL-FREE ANIONIC SUBSTITUTED-2-HYDROXY-1-PHENYL-AZONAPHTHALENE DYES HAVING CATIONS CONTAINING STERICALLY HINDERED AMINE GROUPS

[75] Inventors: Bansi L. Kaul, Biel-Benken, Switzerland; Angelos-Elie Vougioukas, St. Louis, France

[73] Assignee: Sandoz, Ltd., Basel, Switzerland

[21] Appl. No.: 471,991

[22] Filed: Jun. 6, 1995

Related U.S. Application Data

[62] Division of Ser. No. 166,410, Dec. 13, 1993, Pat. No. 5,510,467, which is a continuation of Ser. No. 968,785, Oct. 30, 1992, abandoned, which is a continuation of Ser. No. 689,408, Apr. 22, 1991, abandoned, which is a continuation-in-part of Ser. No. 592,163, Oct. 3, 1990, abandoned.

[30] Foreign Application Priority Data

Oct. 3, 1989 [DE] Germany ............ 39 32 913.5

[51] Int. Cl.⁶ .................................. C09B 31/00
[52] U.S. Cl. ......................................... 534/728
[58] Field of Search ............................... 354/728

[56] References Cited

U.S. PATENT DOCUMENTS

| | | | |
|---|---|---|---|
| 3,681,319 | 8/1972 | Lindberg | 260/156 |
| 3,684,765 | 8/1972 | Matsui et al. | 260/45.8 |
| 3,691,187 | 9/1972 | Grau | 260/304 |
| 3,778,228 | 12/1973 | Kuth et al. | 8/174 |
| 4,102,639 | 7/1978 | Zenhausern et al. | 8/1 |
| 4,115,379 | 9/1978 | Perrey et al. | 260/163 |
| 4,322,509 | 3/1982 | Kuster | 544/343 |
| 4,668,774 | 5/1987 | Loeffler et al. | 534/728 |
| 4,866,113 | 9/1989 | Bitterli et al. | 524/87 |
| 4,877,412 | 10/1989 | Pedrazzi | 8/437 |
| 4,992,495 | 2/1991 | Hari et al. | 524/106 |
| 5,151,505 | 9/1992 | Hari et al. | 534/728 |

FOREIGN PATENT DOCUMENTS

| | | |
|---|---|---|
| 944409 | 12/1963 | United Kingdom . |
| 981050 | 1/1965 | United Kingdom . |
| 2156373 | 10/1985 | United Kingdom . |
| 2184743 | 1/1987 | United Kingdom . |
| 2220418 | 1/1990 | United Kingdom . |

OTHER PUBLICATIONS

Ferruti et al., J. Am. Chem. Soc. 92, 3704–3713 (1970).

*Primary Examiner*—Johann Richter
*Assistant Examiner*—John Peabody
*Attorney, Agent, or Firm*—Robert S. Honor; Melvyn M. Kassenoff

[57] ABSTRACT

Salts of the formula $$F_n A,$$

wherein F is an anion of a metal-free anionic dye having m acid groups
  wherein m is 1 to 4, inclusive,
A is a cation of an amine containing 1 to 6 sterically hindered amine groups, and
n is 1 or 2,
with the proviso that the salt contains 1 to n×m groups selected from ammonium and immonium groups, useful as pigments, particularly for the coloring of solvent-free and solvent-containing plastic materials, lacquers and printing inks.

10 Claims, No Drawings

SALTS OF METAL-FREE ANIONIC SUBSTITUTED-2-HYDROXY-1-PHENYL-AZONAPHTHALENE DYES HAVING CATIONS CONTAINING STERICALLY HINDERED AMINE GROUPS

This is a division of application Ser. No. 08/166,410, filed Dec. 13, 1993, now U.S. Pat. No. 5,510,467, which in turn is a continuation of application Ser. No. 07/968,785, filed Oct. 30, 1992, which in turn is a continuation of application Ser. No. 07/689,408, filed Apr. 22, 1991, which in turn is a continuation-in-part of application Ser. No. 07/592,163, filed Oct. 3, 1990, the latter three of which are now abandoned.

The invention relates to new organic compounds which are practically water-insoluble salts of acid dyestuffs with basic compounds which have at least one sterically hindered amine group. These compounds are excellent as pigments, particularly for the dyeing of solvent-free and solvent-containing plastic materials.

According to the invention there is provided salts of formula I $$F_nA \quad (I)$$

in which F is the residue of a metal-free anionic dyestuff having m acid groups, n is 1 or 2;

m is 1 to 4; and

A is a group containing 1 to 4 sterically hindered amine groups, whereby from 1 to n×m ammonium and/or immonium groups are present in a salt of formula I.

Preferably the acid groups are selected from sulpho and carboxy.

Where the number of ammonium and immonium groups in A is fewer than the number of acid groups in $F_n$, any excess acid groups are in free acid form. All other acid groups are in salt form.

In this specification a sterically hindered amine group is preferably one containing a 2,2,6,6-tetralkylpiperidinyl group, preferably wherein each alkyl is $C_{1-4}$alkyl, more preferably methyl.

The pigments according to the invention are excellent for coloring PVC, all types of polyolefin (HDPE or LDPE (high density polyethylene or low density polyethylene), polypropylene, polyisobutylene, poly-4-methylpentene and copolymers of these). Further, the compounds according to the invention can be used for coloring polystyrene (and copolymers thereof), ABS, Polyvinylacetate, Polyvinylalcohol, Polyacetates, Polyether (POM), Polyacrylates, Polyacrylonitrile, Polyacrylamide, Polyvinylidenechloride, Polyesters, Polyethers, Polythioethers and Thioplasts, Polycarbonates, Polyurethanes, Cellulose derivatives and Maleic acid, Melamine, Phenol, Aniline, Furane, Carbamide, Epoxide and Silicone resins. The compounds of formula I can also be used in lacquers and printing inks for the graphics industry.

Preferably F is F', where F' is a group derived from an acid group-containing non-metallised dyestuff of the azo series, of the phthalocyanine series, of the anthraquinone series, of the perylene series, of the indigo series, of the thioindigo series, of the pyrazolone series, of the perinone series, of the quinacridone series, of the dioxazine series, of the isoindoline series, of the isoindolinone series, of the diketopyrrole series or of the pyrrole series, especially of the azo, the phthalocyanine, indigo, anthraquinone, dioxazine and isoindoline series.

Preferably F' is Fa, where Fa is a group derived from an acid-containing non-metallized dyestuff of the azo, anthraquinone or pyrazolone series. More preferably, Fa is Fb where Fb is selected from a group derived from compounds of formula II, III or IV:

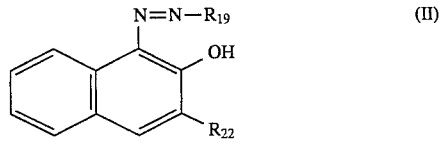  (II)

in which $R_{19}$ is

wherein each $R_{20}$ independently is halogen, $C_{1-4}$alkyl, $C_{1-4}$alkoxy or hydrogen, and $R_{21}$ is hydrogen, sulpho, $C_{1-4}$alkyl, $C_{1-4}$alkoxy, halogen, —C(halogen)$_3$ or

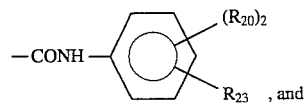, and and $R_{22}$ is carboxy or

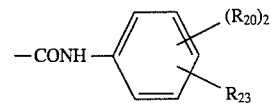

wherein $R_{23}$ is sulpho, halogen, $C_{1-4}$alkyl, $C_{1-4}$alkoxy or hydrogen;

with the proviso that $R_{22}$ is carboxy or contains a sulfo group when $R_{19}$ does not contain a sulpho group;

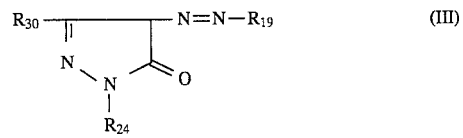  (III)

in which $R_{30}$ is carboxy or $C_{1-4}$alkyl; $R_{24}$ is phenyl or phenyl monosubstituted by sulpho with the proviso that when neither $R_{19}$ nor $R_{24}$ contains a sulpho group, $R_{30}$ is carboxy;

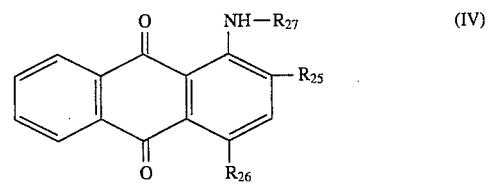  (IV)

wherein $R_{25}$ is sulpho, hydrogen or halogen; with the proviso that when the compound contains one $R_{25}$ group and $R_{25}$ is other than sulpho, at least one $R_{28}$ is carboxy or sulpho, and when the compound contains two $R_{25}$ groups, at least one of them is sulpho;

$R_{27}$ is hydrogen or cyclohexyl, and
$R_{26}$ is 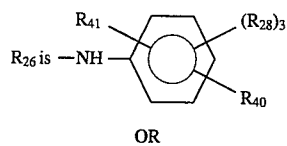
OR
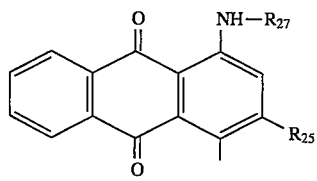
wherein each $R_{28}$ independently is carboxy, $C_{1-4}$alkyl, sulpho, $C_{1-4}$alkoxy, halogen, hydrogen or —NHCO—$C_6H_5$, and $R_{40}$ is hydrogen, methyl, —$CH_2NHCOC(Cl)=CH_2$ or —NH—CO—$C_{1-4}$alkyl; and $R_{41}$ is hydrogen or halogen.
Even more preferably F is preferably F''', where F''' is a compound of formulae $F_1$ to $F_{43}$:
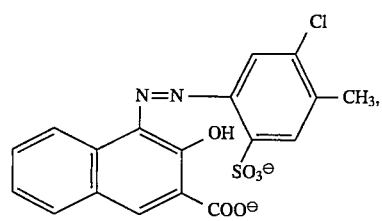
$F_1$
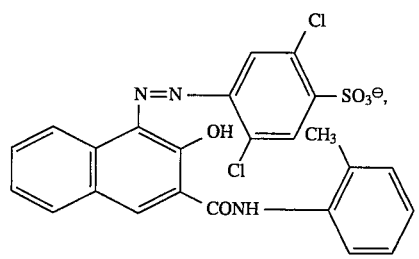
$F_2$
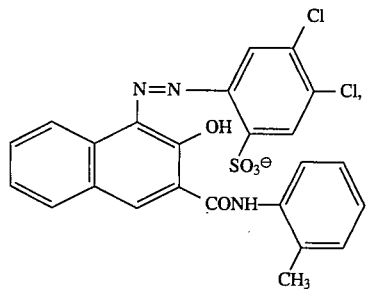
$F_3$
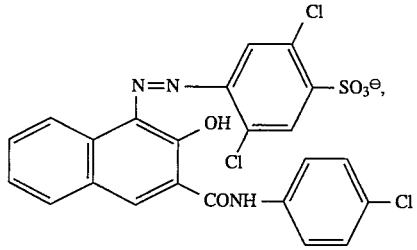
$F_4$ -continued
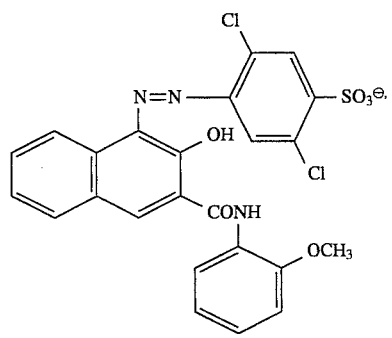
F₅
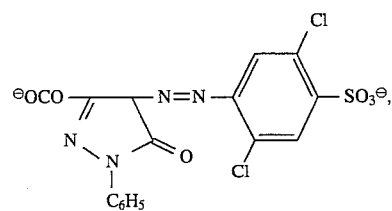
F₆
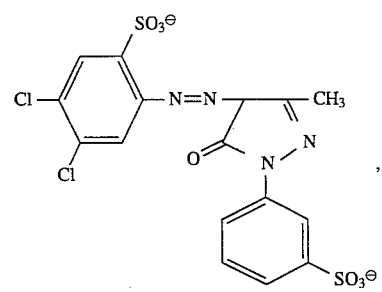
F₇
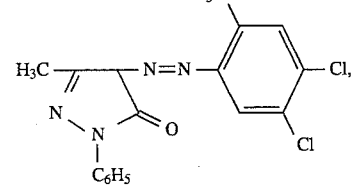
F₈
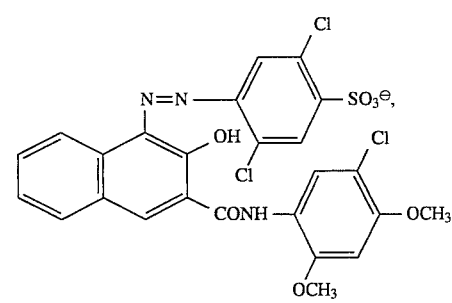
F₉
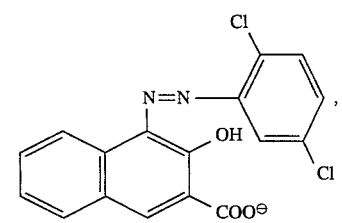
F₁₀

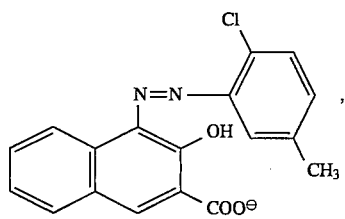 F₁₁
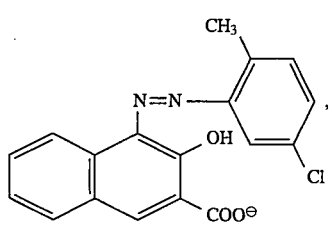 F₁₂
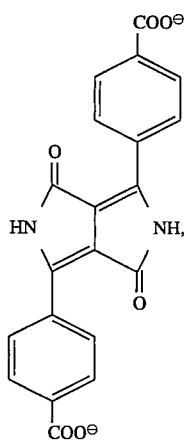 F₁₃
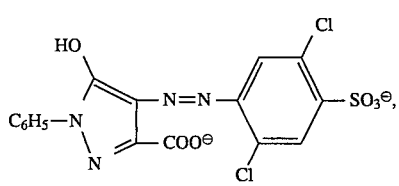 F₁₄
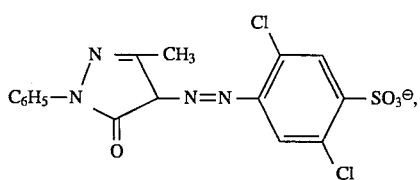 F₁₅
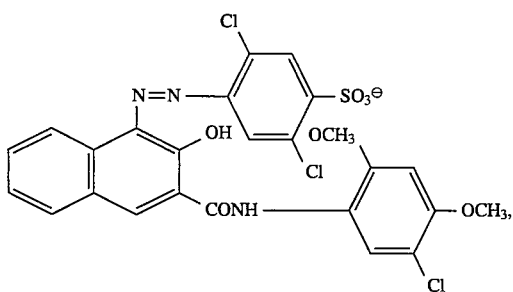 F₁₆

-continued
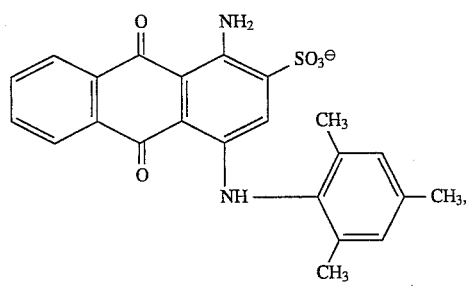 F17
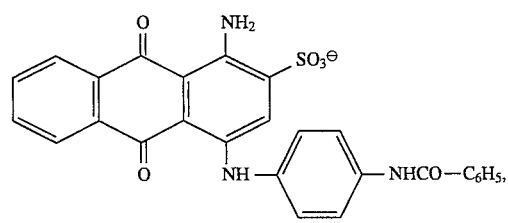 F18
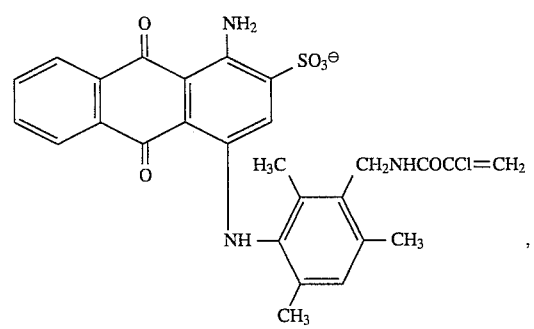 F19
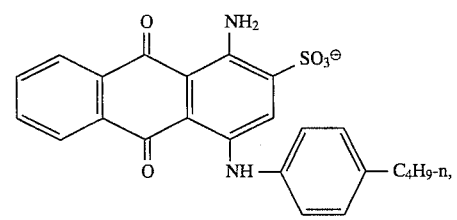 F20
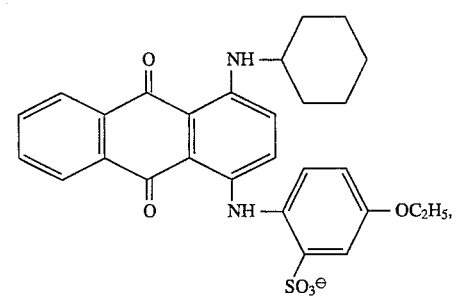 F21
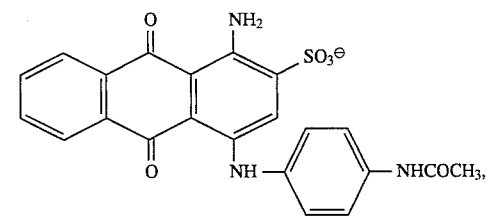 F22

-continued
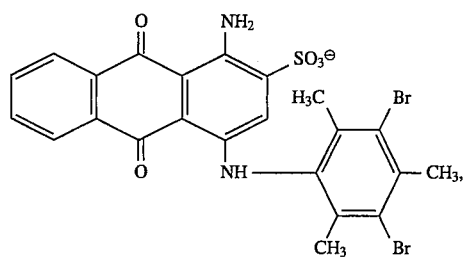  F23
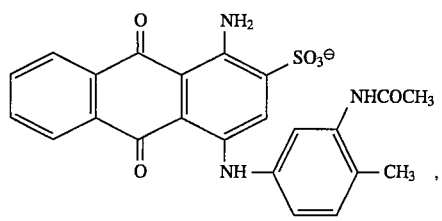  F24
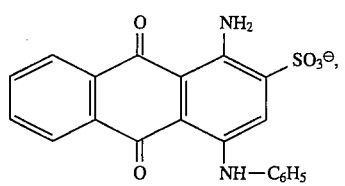  F25
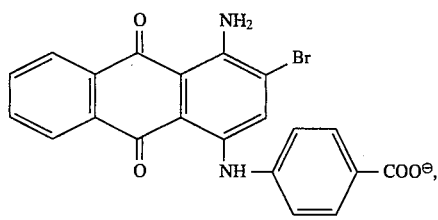  F26
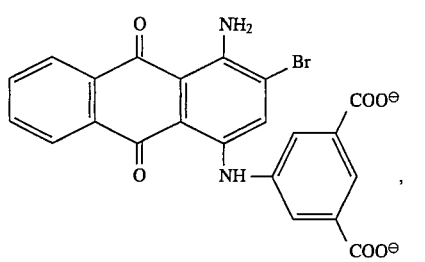  F27
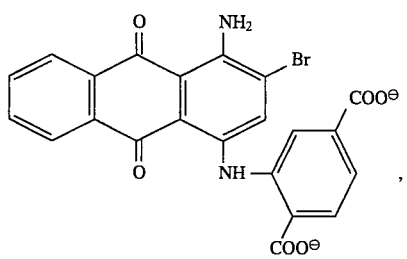  F28
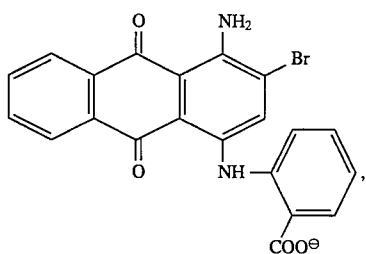  F29

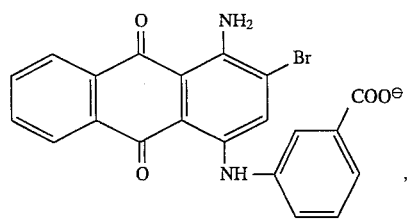
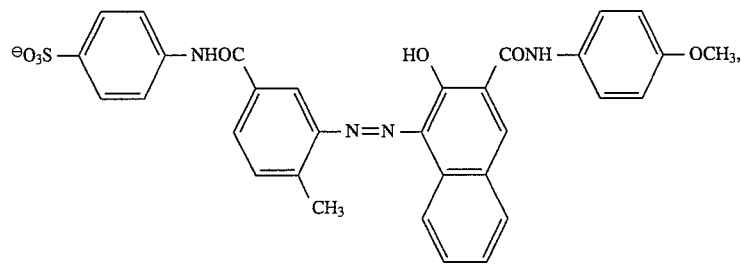
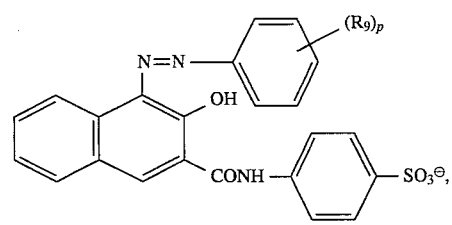
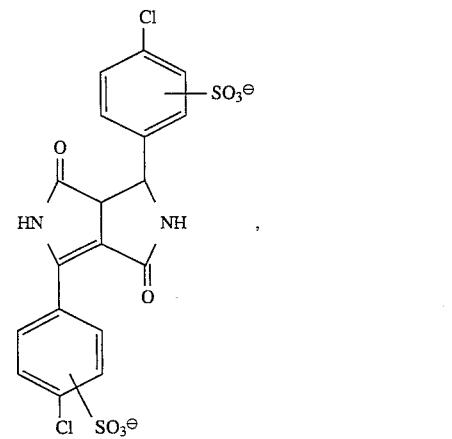
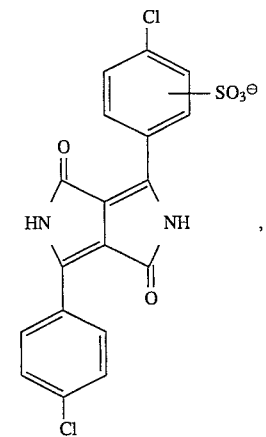

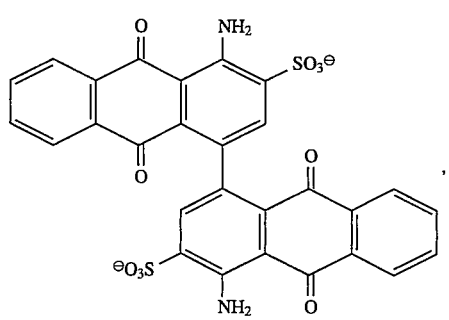 F35
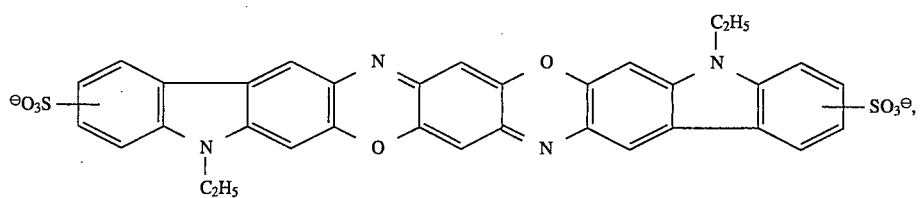 F36
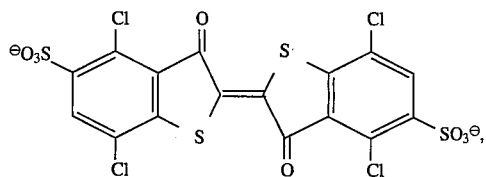 F37
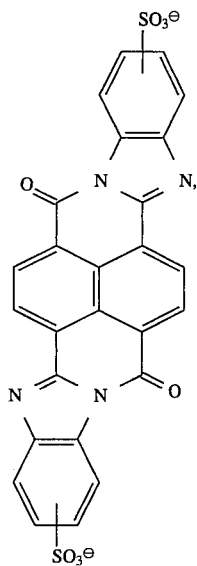 F38
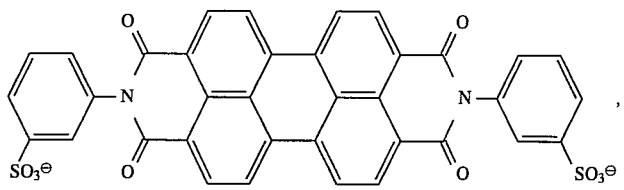 F39
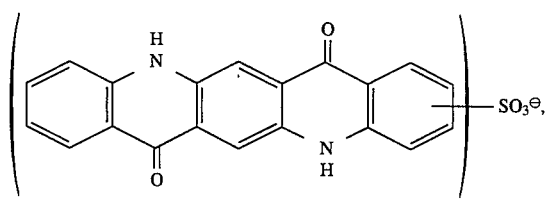 F40

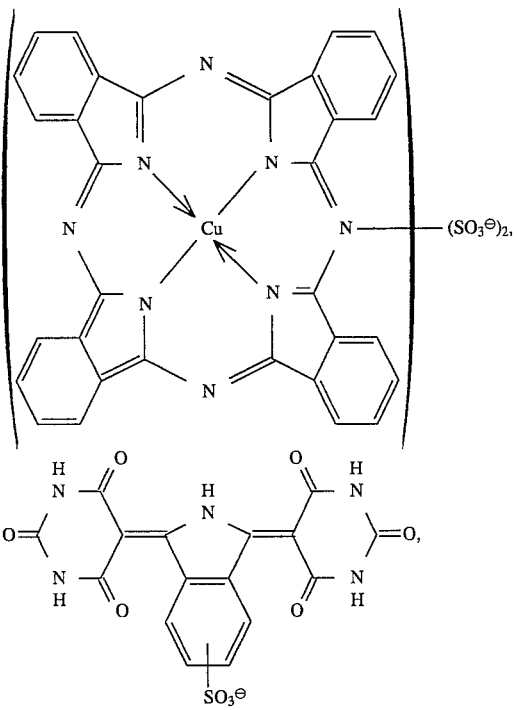

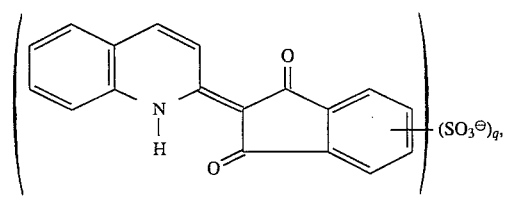

Preferably any sterically hindered amine group present is selected from formulae (a) to (e) below:

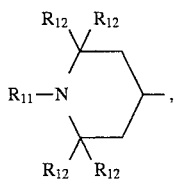
(a)

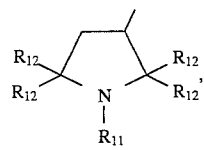
(d)

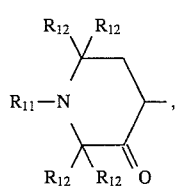
(b)

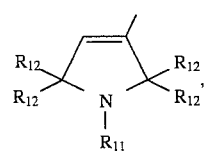
(e)

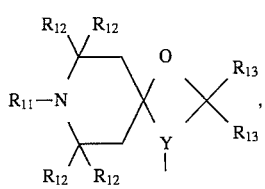
(c)

in which $R_{11}$ is hydrogen or $C_{1-4}$alkyl, preferably hydrogen or methyl, more preferably hydrogen;

each $R_{12}$ independently is $C_{1-6}$alkyl, preferably methyl;

both groups $R_{13}$ independently are hydrogen, methyl or ethyl or one group $R_{13}$ is phenyl and the other $R_{13}$ is hydrogen, methyl or ethyl or both groups $R_{13}$ together form a group of —$(CH_2)$—$_{5-11}$ and Y is a group of the formula $$-\underset{|}{N}CO- \quad \text{or} \quad -CO-\underset{|}{N}-.$$

Preferably A is A' where A' is a cationic group derived from a compound selected from $A_1$–$A_{29}$ $A_1$  1,3,5-Tri-(1',2',2',6',6'-pentamethylpiperidyl-4'-)trimesinic acid triamide, $A_2$  2,4-Bis-(2',2',6',6'-tetramethylpiperidyl-4'-amino)-6-chlorotriazine, $A_3$  2,4,6-Tri-(2',2',6',6'-tetramethylpiperidyl-4'-amino)triazine, $A_4$  Bis-(2',2',6',6'-tetramethylpiperidyl-4'-aminocarbonyl-paraphenylene)-terephthalic acid diamide, the compound of the formula

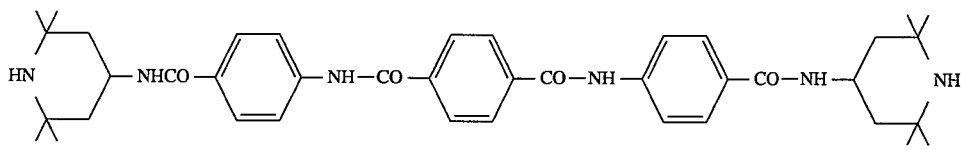

$A_5$  Bis-(2',2',6',6'-tetramethylpiperidyl-4'-)terephthalic acid amide, $A_6$  2,4-Bis-(2',2',6',6'-tetramethylpiperidyl-4'-amino-)quinazoline, $A_7$  2,3-Bis-(2',2',6',6'-tetramethylpiperidyl-4'-amino)quinoxaline, $A_8$  1,4-Bis-(2',2',6',6'-tetramethylpiperidyl-4'-amino)phthalazine, $A_9$  2-Chloro-4,6-bis-(2',2',6',6'-tetramethylpiperidyl-4'-amino)pyrimidine, $A_{10}$  2,5-Dichloro-4,6-bis-(2',2',6',6'-tetramethylpiperidyl-4'-amino)pyrimidine, $A_{11}$  2-Fluoro-5-chloro-4,6-bis-(2',2',6',6'-tetramethylpiperidyl-4'-amino)pyrimidine, $A_{12}$  2,4,6-Tri-(2',2',6',6'-tetramethylpiperidyl-4'-amino)pyrimidine, $A_{13}$  2,4,6-Tri-(2',2',6',6'-tetramethylpiperidyl-4'-amino)-5-chloropyrimidine,

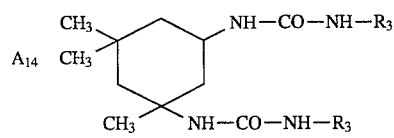
A14
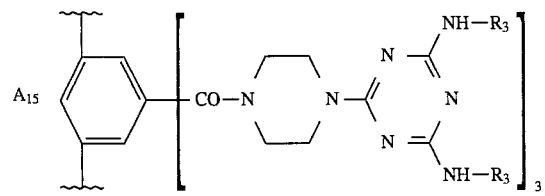
A15
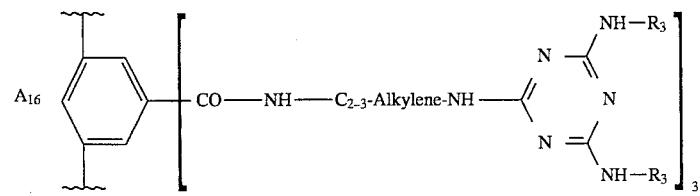
A16
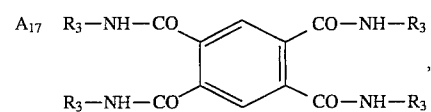
A17
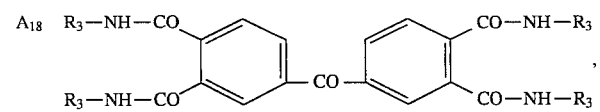
A18
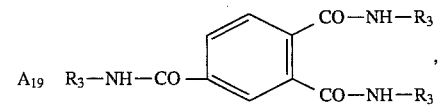
A19
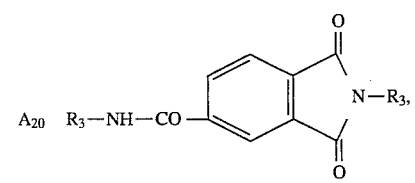
A20
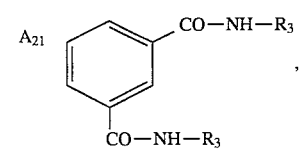
A21
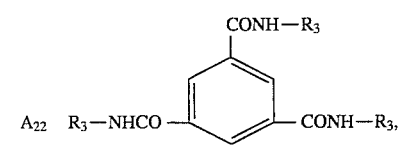
A22
A23  Bis-(1,2,2,6,6-pentamethylpiperidyl-4)-terephthalic acid amide,
A24  Bis-(1,2,2,6,6-pentamethylpiperidyl-4)-isophthalic acid amide,
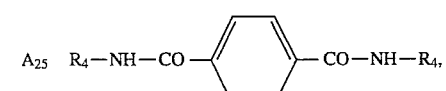
A25
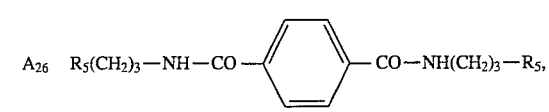
A26

-continued

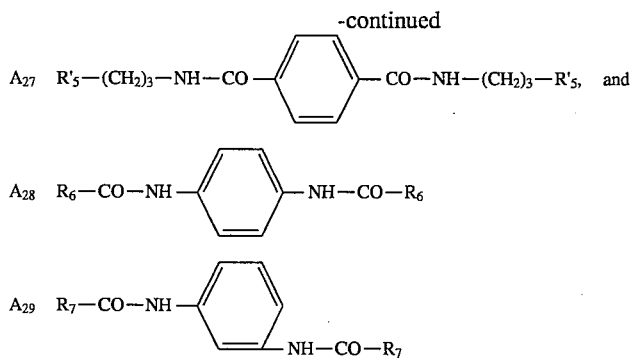

in which $R_3$ is 2,2,6,6-tetramethylpiperidyl-4-; $R_4$ is a group of formula b) defined above;

$R_5$ is a group of formula c) as defined above, wherein Y is

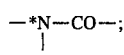

$R_5'$ is a group of formula c) as defined above, wherein Y is

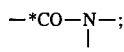

where the * atom is attached to the piperidyl group;

$R_6$ is a group of formula d) defined above, and $R_7$ is a group of formula e) defined above; the other symbols appearing in said formulae being as defined above.

The production of the compounds of formula $A_1$ to $A_{29}$ can be carried out by known methods, preferably through condensation of the corresponding amine with the corresponding carboxylic acid (or carboxylic acid chloride) or, for example, the condensation of the corresponding amine with trichlorotriazine, dichloroquinazoline, dichloroquinoxaline, dichlorophthalazine or tri- or tetrachloropyrimidine. Corresponding compounds containing the groups of formulae a) to e) are known.

The production of the nay pigments can be carried out by salting the appropriate dyestuff with a basic compound A by known methods. For example, acid dyestuffs as obtained after production, i.e. in the form of sodium salts, can be reacted in the presence of an adequate amount of mineral acid (for example HCl) with the basic components A to form the salt.

The compounds of formula I are very strong in color, either when they are used in small amounts or when they are used in the usual amounts for other organic pigments. Normal amounts used are from 0.02 to 5%, more preferably 0.06 to 3%, by weight of the substrate to be pigmented. The colorings using the compounds of formula I show excellent light fastness. Furthermore the substrates to which the compounds of formula I have been applied show excellent stability against the detrimental effects of UV light, heat and oxidation.

The following examples illustrate the invention, in which all parts and percentages are by weight and all temperatures given are in °C.

EXAMPLE 1 a) 10.15 parts of terephthalic acid dichloride are stirred into 70 parts of toluene and 19.5 parts of triacetone diamine, the compound of the formula

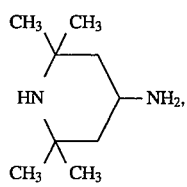

are added at room temperature over 3 hours. The resulting suspension is diluted with a further 30 parts of toluene and then boiled under reflux for 18 hours continually stirring. The resulting precipitate is then filtered, washed with acetone, stirred in 50 parts of water, brought to a pH of about 13 with sodium hydroxide, filtered again, washed with water again and dried under vacuum. The resulting white powder melts at temperatures over 300°.

b) 4.84 parts of 3,4-dichloroaniline-6-sulphonic acid are dissolved in 11 parts of 15% hydrochloric acid, the solution is cooled to 0° to 4° and then diazotised with 6 parts of 4N $NaNO_2$, the $NaNO_2$ excess being destroyed with aminosulphonic acid. A solution of 3.48 parts of 1-phenyl-3-methyl-5-pyrazolone in 20 parts of water and 2.2 parts of 30% sodium hydroxide is added while keeping the mixture at 0 to 40, the addition being carried out slowly and under stirring. This is then stirred for 18 hours at room temperature, then heated while stirring for 2 hours to 60°, filtered and the residue is washed with water. It is then dried, then taken up in water again and the pH is brought to about 8.5 using dilute NaOH.

c) 4.42 parts of the product of a) above is brought into solution in 30 parts water and 1.9 parts of 33% hydrochloric acid. The mixture of part b) is added slowly over 30 minutes while stirring and, to improve the stirrability, further water is added to the mixture. The mixture is the heated for 2½ hours to 60° and cooled to room temperature, and the residue is filtered, washed with water and dried, the melting point of the resulting yellow-orange powder is over 300°.

By a method analogous to that of Example 1, further pigments of the formula $F_n$-A in which the symbols defined in the Table below can be prepared from known compound. The nuance of the pigmented substrate is given in the last column.

TABLE

| Example Number | n | F | A | Variation of Coloration |
|---|---|---|---|---|
| 2 | 1 | $F_6$ | $A_1$ | yellow |
| 3 | 1 | $F_6$ | $A_{21}$ | " |
| 4 | 1 | $F_6$ | $A_5$ | " |
| 5 | 1 | $F_6$ | $A_4$ | " |
| 6 | 1 | $F_1$ | $A_{21}$ | red |
| 7 | 1 | $F_7$ | $A_{21}$ | yellow |
| 8 | 1 | $F_1$ | $A_5$ | red |
| 9 | 1 | $F_7$ | $A_5$ | yellow |
| 10 | 1 | $F_1$ | $A_4$ | red |
| 11 | 1 | $F_7$ | $A_4$ | yellow |
| 12 | 1 | $F_1$ | $A_1$ | red |
| 13 | 1 | $F_7$ | $A_1$ | yellow |
| 14 | 2 | $F_2$ | $A_5$ | red |
| 15 | 2 | $F_3$ | $A_5$ | " |
| 16 | 2 | $F_8$ | $A_5$ | yellow |
| 17 | 2 | $F_{15}$ | $A_5$ | " |
| 18 | 2 | $F_{15}$ | $A_2$ | yellow |
| 19 | 2 | $F_5$ | $A_5$ | red |
| 20 | 2 | $F_2$ | $A_2$ | orange-red |
| 21 | 1 | $F_2$ | $A_2$ | red |
| 22 | 2 | $F_5$ | $A_2$ | " |
| 23 | 2 | $F_4$ | $A_2$ | " |
| 24 | 2 | $F_4$ | $A_5$ | orange-red |
| 25 | 2 | $F_{16}$ | $A_4$ | red |
| 26 | 2 | $F_{17}$ | $A_5$ | blue |
| 27 | 2 | $F_{26}$ | $A_5$ | " |
| 28 | 2 | $F_{29}$ | $A_5$ | " |
| 29 | 2 | $F_9$ | $A_{24}$ | red |
| 30 | 2 | $F_{10}$ | $A_{24}$ | " |
| 31 | 2 | $F_{11}$ | $A_{24}$ | " |
| 32 | 2 | $F_{12}$ | $A_{23}$ | " |
| 33 | 1 | $F_{13}$ | $A_{23}$ | " |
| 34 | 2 | $F_{14}$ | $A2_2$ | " |
| 35 | 2 | $F_{16}$ | $A_{23}$ | " |
| 36 | 2 | $F_{18}$ | $A_3$ | blue |
| 37 | 2 | $F_{19}$ | $A_8$ | " |
| 38 | 2 | $F_{20}$ | $A_9$ | " |
| 39 | 2 | $F_{21}$ | $A_{11}$ | " |
| 40 | 2 | $F_{22}$ | $A_{17}$ | " |
| 41 | 2 | $F_{23}$ | $A_{20}$ | " |
| 42 | 2 | $F_{24}$ | $A_{19}$ | " |
| 43 | 2 | $F_{25}$ | $A_{14}$ | " |
| 44 | 2 | $F_{31}$ | $A_{23}$ | red |
| 45 | 1 | $F_{33}$ | $A_{23}$ | " |
| 46 | 1 | $F_{35}$ | $A_2$ | " |
| 47 | 1 | $F_{35}$ | $A_5$ | " |
| 48 | 1 | $F_{36}$ | $A_5$ | violet |
| 49 | 1 | $F_{36}$ | $A_6$ | " |
| 50 | 1 | $F_{41}$ | $A_7$ | blue |
| 51 | 1 | $F_{37}$ | $A_8$ | red-violet |
| 52 | 2 | $F_{42}$ | $A_9$ | yellow |
| 53 | 2 | $F_{42}$ | $A_{10}$ | " |
| 54 | 1 | $F_{41}$ | $A_{14}$ | blue |
| 55 | 2 | $F_{41}$ | $A_{17}$ | " |
| 56 | 2 | $F_{39}$ | $A_{18}$ | red |
| 57 | 1 | $F_{38}$ | $A_6$ | orange |
| 58 | 1 | $F_{43}(a=2)$ | $A_6$ | yellow |
| 59 | 2 | $F_{40}$ | $A_{22}$ | red |

Examples 48–50, 52–55 and 57–59 are mixtures.

APPLICATION EXAMPLE A 4 parts of the pigment of Example 1 are ground together with 96 parts of a mixture of 50 parts of 60% solution of Coco-aldehyde-melamine resin having a fat content in Xylene of 32%, 30 parts of 50% melamine resin solution in butanol, 10 parts of xylene and 10 parts of ethylene glycol monoethyl ether for 24 hours in a ball mill. The resulting dispersion is then sprayed onto an aluminum sheet, dried for 30 minutes in air and then stoved for 30 minutes at 120°. A brilliant reddish-yellow film with very good light and weathering properties results.

APPLICATION EXAMPLE B

A 0.1% dye colored PVC sheet (colored pigment to white pigment ratio being 1:5) can be made as follows;

16.5 parts of a mixture of equal parts of dioctyl phthalate and dibutyl phthalate are mixed 0.05 parts of the pigment of Example 1 and 0.25 parts of titanium dioxide.

33.5 parts of polyvinylchloride are added.

The mixture is then rolled between two rollers to produce a sheet that is cut up with a spatula and rolled together again. One of the rollers is kept at a temperature of 40° the other at a temperature of 140°. Finally the mixture is then taken off as a sheet and pressed between to polishing metal plates 160° for 5 minutes.

A reddish-yellow colored PVC folio having a high brilliance and very good migration and light fastness properties results.

Application Examples A & B can be repeated using instead of the pigment of Example 1, an equivalent amount of any one of the products of Examples 2–59, inclusive.

We claim:

1. A salt of the formula $$F_nA,$$

wherein F is an onion of a compound of the formula

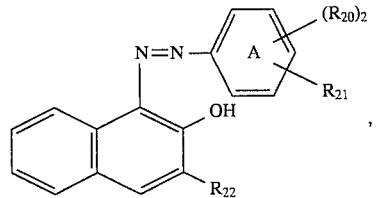

wherein $R_{21}$ is hydrogen, sulfo, $C_{1-4}$alkyl, $C_{1-4}$alkoxy, halo, trihalomethyl or

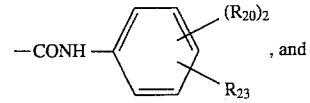, and $R_{22}$ is carboxy or

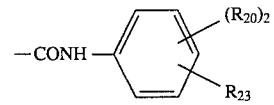

with the proviso that $R_{22}$ must be carboxy or contain a sulfo group when Ring A does not bear a sulfo group, wherein each $R_{20}$ is independently hydrogen, halo, $C_{1-4}$alkyl or $C_{1-4}$alkoxy, and $R_{23}$ is hydrogen, sulfo, halo, $C_{1-4}$alkyl or $C_{1-4}$alkoxy, A is a cation of an amine selected from the group consisting of 1,3,5-tri-(1',2',2',6',6'-pentamethylpiperid-4'-yl)trimesinic acid triamide, 2,4-bis-(2',2',6',6'-tetramethylpiperid-4'-ylamino)-6-chloro-1,3,5-triazine, 2,4,6-tri-(2',2',6',6'-tetramethylpiperid-4'-ylamino)-1,3,5-triazine,

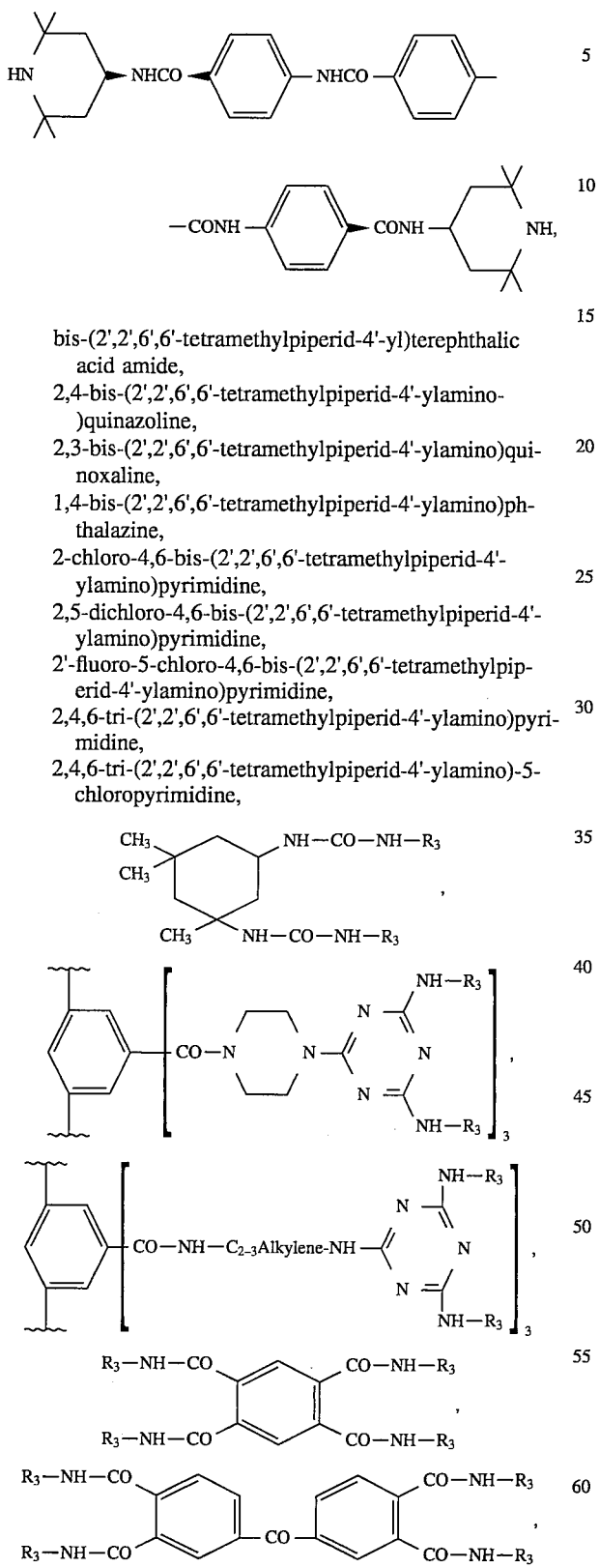

bis-(2',2',6',6'-tetramethylpiperid-4'-yl)terephthalic acid amide,
2,4-bis-(2',2',6',6'-tetramethylpiperid-4'-ylamino)quinazoline,
2,3-bis-(2',2',6',6'-tetramethylpiperid-4'-ylamino)quinoxaline,
1,4-bis-(2',2',6',6'-tetramethylpiperid-4'-ylamino)phthalazine,
2-chloro-4,6-bis-(2',2',6',6'-tetramethylpiperid-4'-ylamino)pyrimidine,
2,5-dichloro-4,6-bis-(2',2',6',6'-tetramethylpiperid-4'-ylamino)pyrimidine,
2'-fluoro-5-chloro-4,6-bis-(2',2',6',6'-tetramethylpiperid-4'-ylamino)pyrimidine,
2,4,6-tri-(2',2',6',6'-tetramethylpiperid-4'-ylamino)pyrimidine,
2,4,6-tri-(2',2',6',6'-tetramethylpiperid-4'-ylamino)-5-chloropyrimidine,

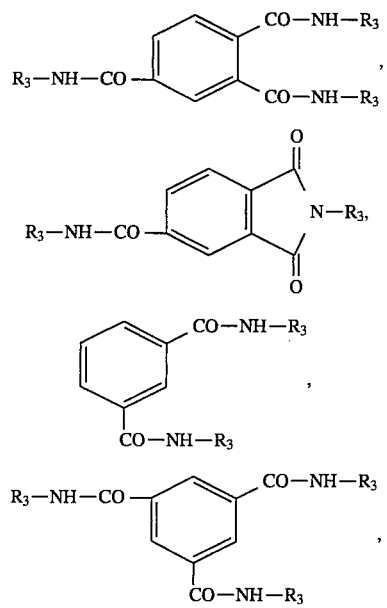

bis-(1,2,2,6,6-pentamethylpiperid-4-yl)terephthalic acid amide,
bis-(1,2,2,6,6-pentamethylpiperid-4-yl)isophthalic acid amide,

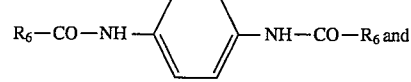

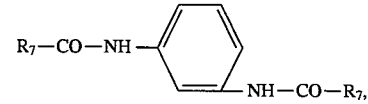

wherein each $R_3$ is 2,2,6,6-tetramethylpiperid-4-yl, each $R_4$ is

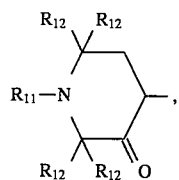

each $R_5$ is

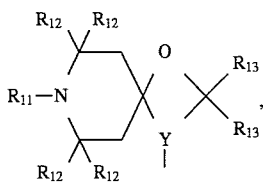

wherein Y is

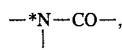

wherein the * identifies the atom attached to the piperidyl group, each $R'_5$ is

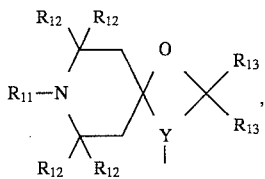

wherein Y is

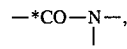

wherein the * identifies the atom attached to the piperidyl group, each $R_6$ is

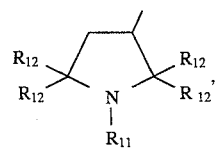

and
each $R_7$ is

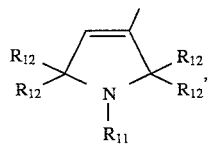

wherein $R_{11}$ is hydrogen or $C_{1-4}$alkyl,
each $R_{12}$ is independently $C_{1-6}$alkyl,
each $R_{13}$ is independently hydrogen, methyl, ethyl or phenyl, with the proviso that not more than one $R_{13}$ is phenyl, or both $R_{13}$'s taken together are $-(CH_2)_z-$, wherein Z is 5 to 11, inclusive, and
n is 1 or 2.

2. A salt according to claim 1 wherein F is an anion of the formula

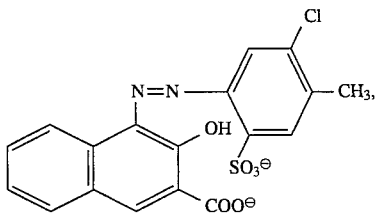

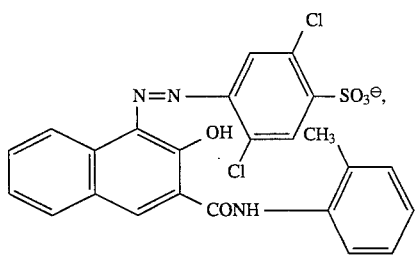

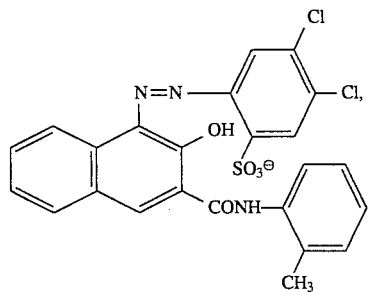

-continued
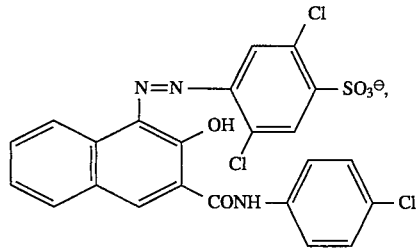
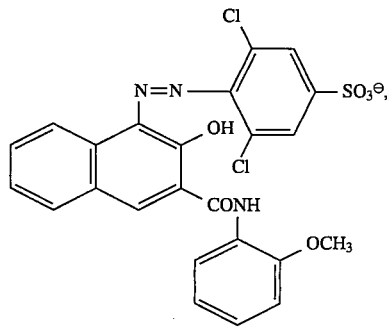
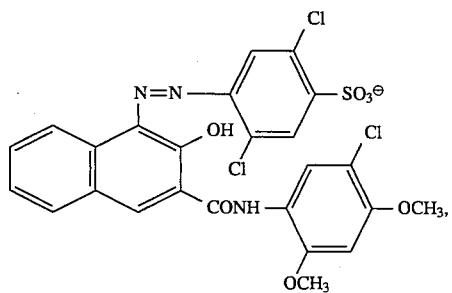
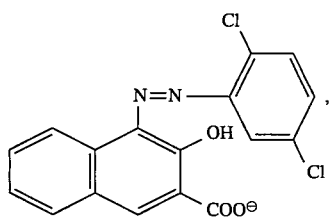
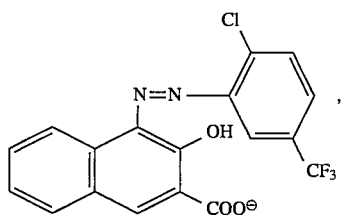
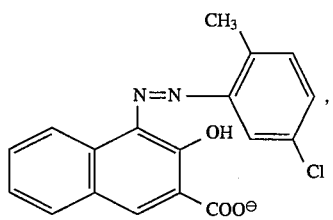

-continued

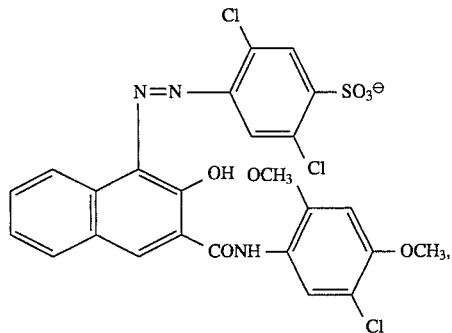

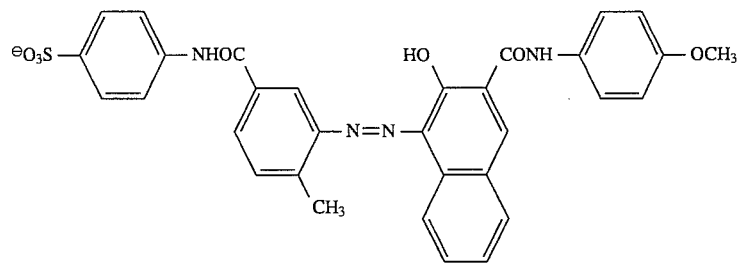

or

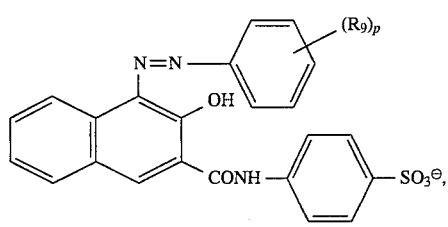

wherein each $R_9$ is independently chloro, bromo, $C_{1-3}$alkyl or $C_{1-3}$alkoxy, and
p is 1, 2 or 3.

3. A salt according to claim 1 wherein A is a cation of an amine other than 1,3,5-tri-(1',2',2',6',6'-pentamethylpiperid-4'-yl)trimesinic acid triamide.

4. A salt according to claim 3 wherein A is a cation of an amine having 1 to 4 2,2,6,6-tetramethylpiperid-4-yl groups.

5. A salt according to claim 2 wherein A is a cation of an amine other than 1,3,5-tri-(1',2',2',6',6'-pentamethylpiperid-4'-yl)trimesinic acid triamide.

6. A salt according to claim 5 wherein A is a cation of an amine having 1 to 4 2,2,6,6-tetramethylpiperid-4-yl groups.

7. The salt according to claim 6 having the formula

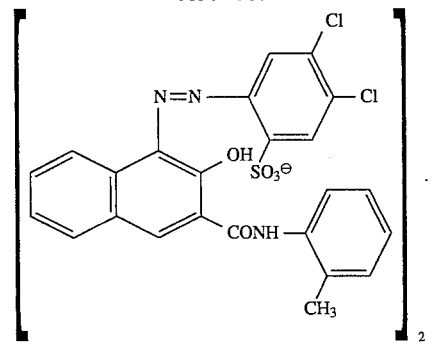

-continued

8. The salt according to claim 6 having the formula

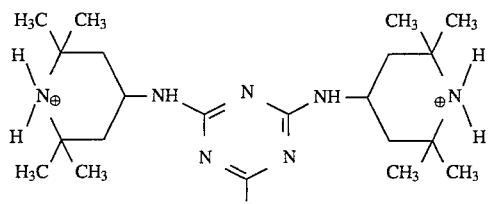

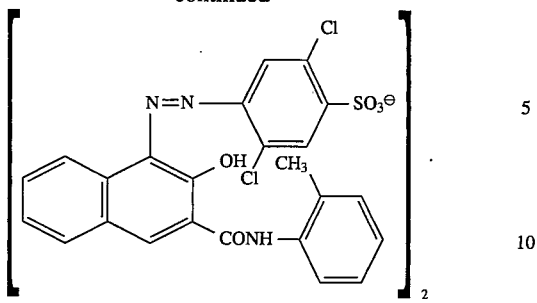
9. The salt according to claim 6 having the formula
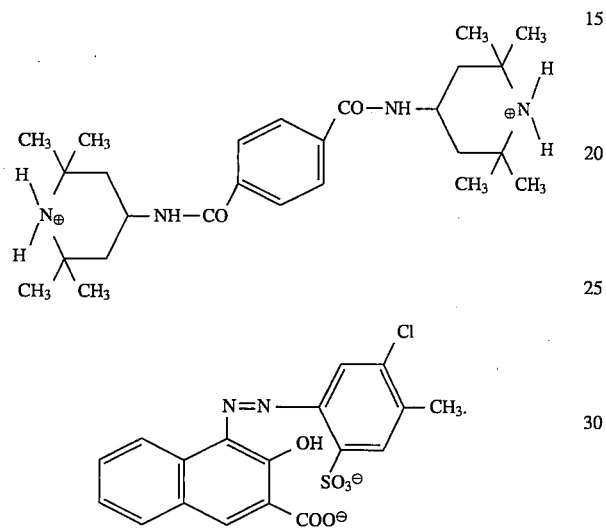
10. The salt according to claim 6 having the formula
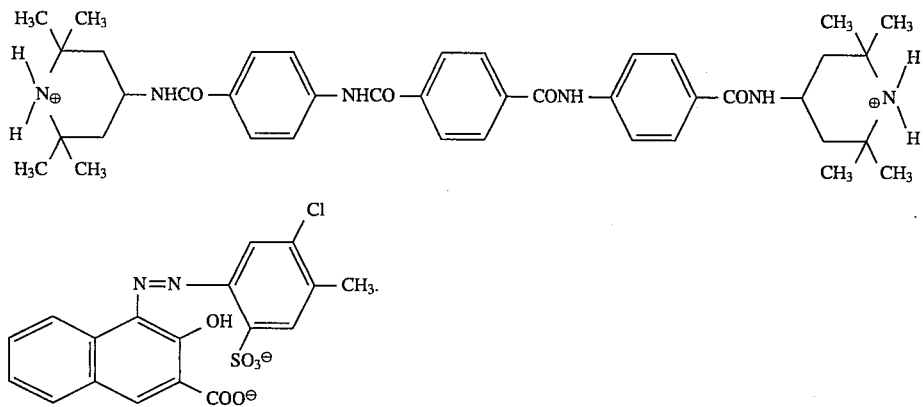
* * * * *